United States Patent [19]

Takai et al.

[11] Patent Number: 4,759,015

[45] Date of Patent: Jul. 19, 1988

[54] RING NETWORK SYSTEM FOR TRANSMISSION OF MULTICAST INFORMATION

[75] Inventors: Atsushi Takai, Kodaira; Kazunori Nakamura, Hadano; Yoshihiro Takiyasu, Higashimurayama; Nagatoshi Usami, Kanagawa; Mitsuhiro Yamaga, Kawasaki, all of Japan

[73] Assignee: Hitachi, Ltd. and Hitachi Microcomputer Eng. Ltd., Tokyo, Japan

[21] Appl. No.: 911,793

[22] Filed: Sep. 26, 1986

[30] Foreign Application Priority Data

Sep. 30, 1985 [JP] Japan ................... 60-214719

[51] Int. Cl.[4] .............. H04J 3/00; H04J 3/16
[52] U.S. Cl. .................... 370/86; 370/89; 340/825.05
[58] Field of Search ............ 370/85, 89, 86, 94 V; 340/825.05, 825.06, 825.07

[56] References Cited

U.S. PATENT DOCUMENTS 4,566,098 1/1986 Gammage et al. ............ 340/825.05
4,569,044 2/1986 Tao et al. ...................... 370/89
4,575,846 3/1986 Yokomizo ..................... 370/89

Primary Examiner—Douglas W. Olms
Assistant Examiner—Frank M. Scutch, III
Attorney, Agent, or Firm—Antonelli, Terry & Wands

[57] ABSTRACT

In a network system wherein a plurality of terminal devices communicates with each other via respective node devices over a ring transmission line, a transmitting node device can confirm whether a multicast information transmission has succeeded or failed. The transmitting node device send a response frame after a multicast information frame. A receiving node device relays the multicast information frame and a response frame from the upstream node device to the downstream one when the multicast information has been received successfully, or in case of a failure in receiving the multicast information, sends a response frame to the downstream node device by changing at least part of the response frame from the upstream node device. The transmitting node device can determine from a received response frame if there is one or more of the receiving node devices which cannot receive the multicast information.

5 Claims, 3 Drawing Sheets

F I G. 1
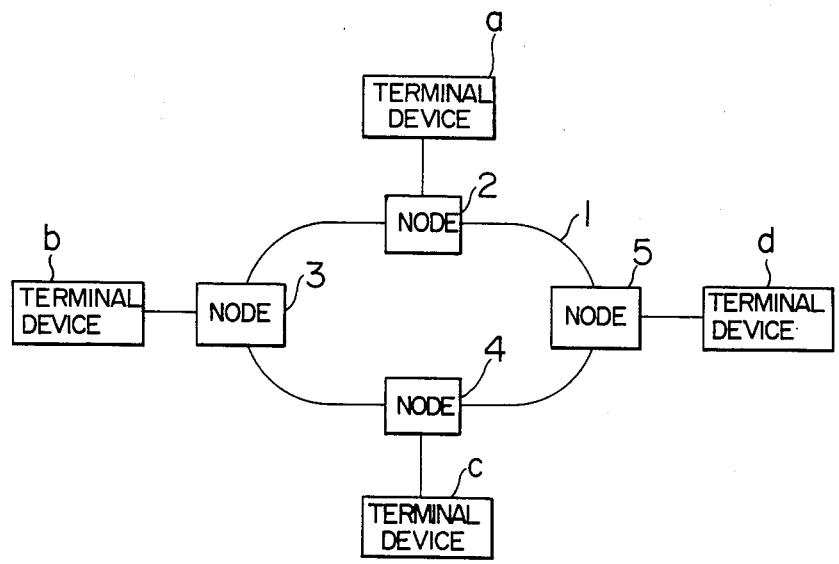
F I G. 2
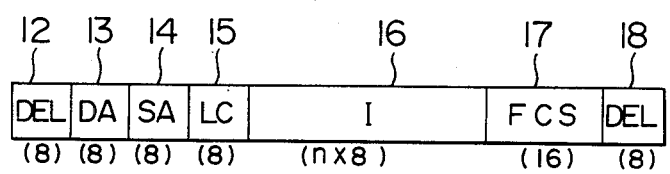

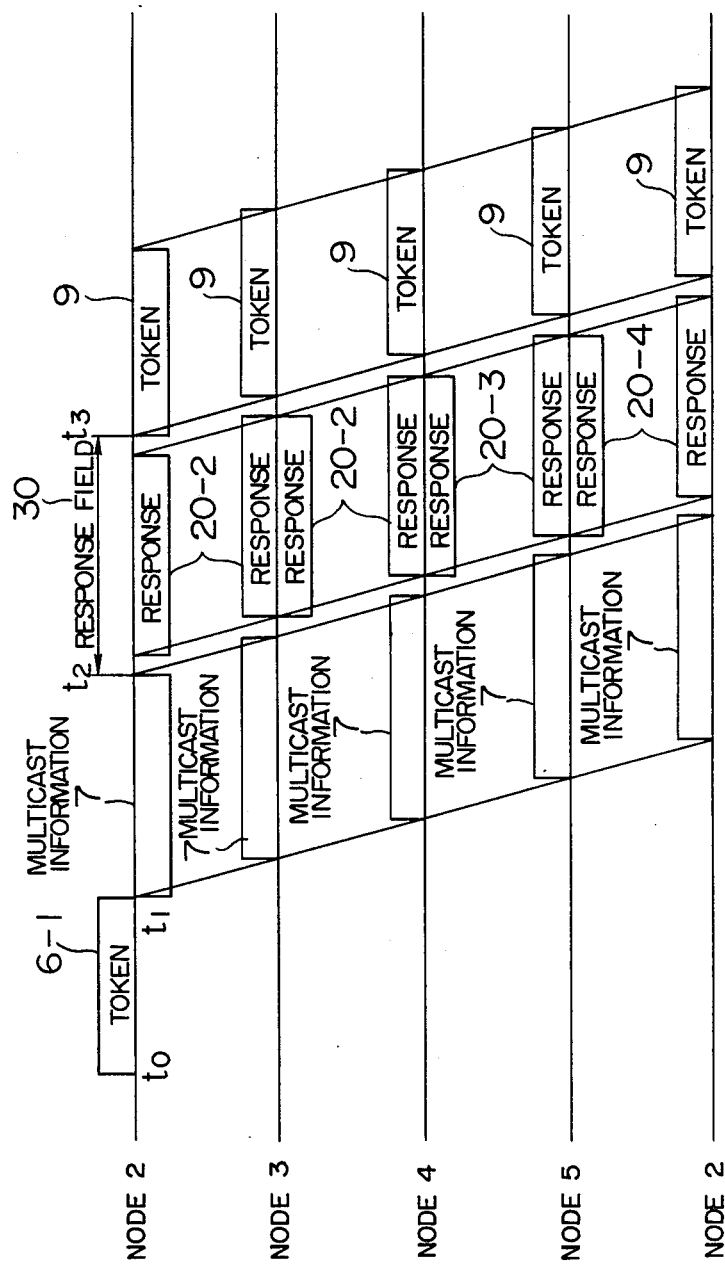

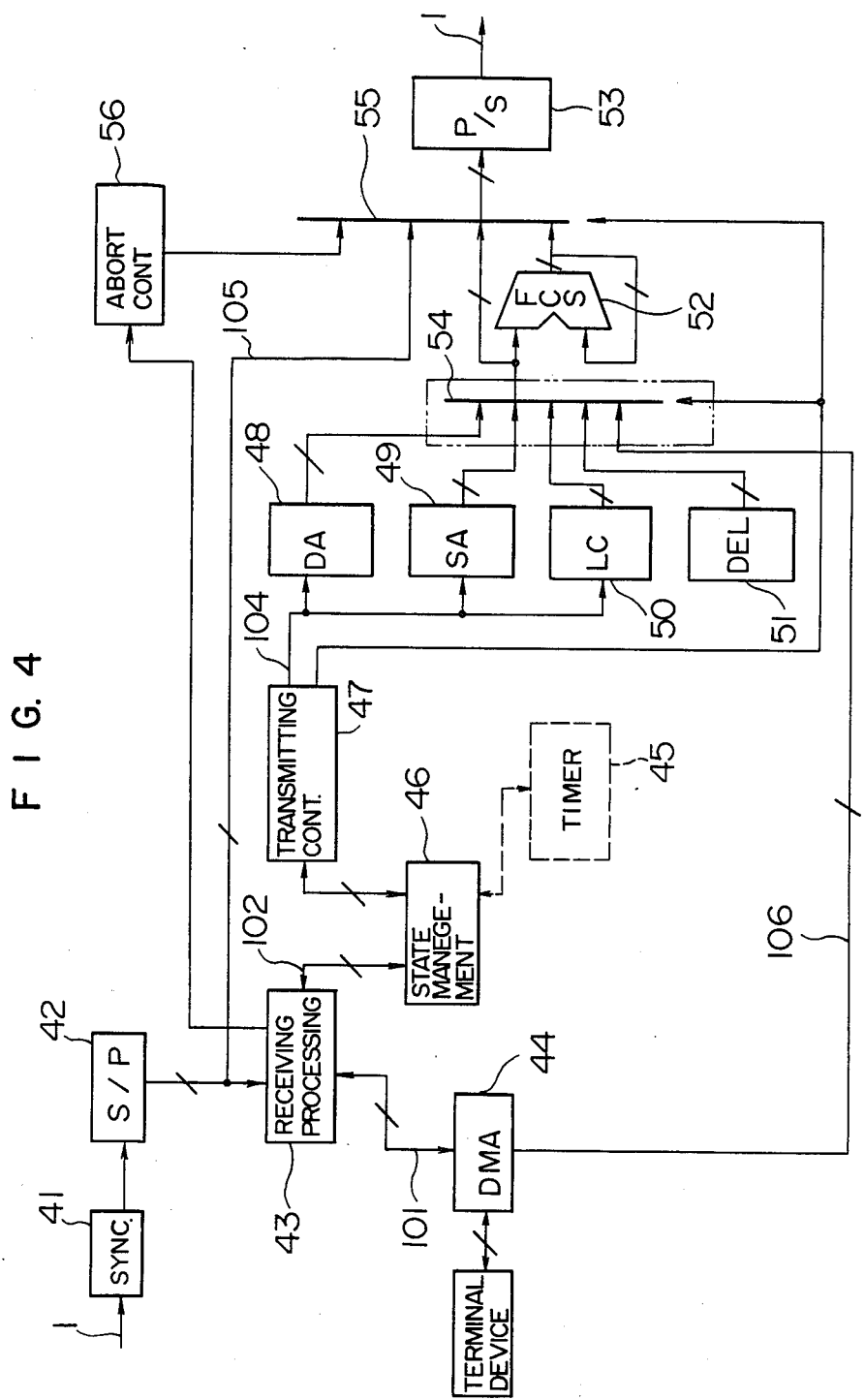

RING NETWORK SYSTEM FOR TRANSMISSION OF MULTICAST INFORMATION

BACKGROUND OF THE INVENTION

The present invention relates to a ring network system for transmitting multicast information and, more particularly, to a network system wherein a plurality of data processing units (or terminal devices) are connected via node devices (communication control units) to a ring communication channel or transmission line for mutual data communication, and in the case where information of the same content (multicast information) are sent in common from a certain terminal device to other terminal devices, the network system can confirm whether the multicast information has been sent to all of the other terminal devices.

A conventional ring network system, however, is not constructed such that each terminal device generates a response frame signal (hereinafter called merely response frame) upon reception of multicast information. The reason for this is that since a plurality of responses are returned from receiving nodes, collision between responses occurs or the response processing at a transmitting node becomes complicated. Therefore, there arises a problem that it is impossible to confirm whether all of the receiving nodes have received multicast information.

SUMMARY OF THE INVENTION

It is therefore an object of the present invention to provide a ring network system for transmitting multicast information to a plurality of terminal devices (hereinafter called node device) via a ring transmission line, wherein a node device transmitting the multicast information can confirm, by means of a simple measure, whether all of the receiving node devices have received the multicast information.

To achieve the above object, the present invention is constructed such that when multicast information is sent to a plurality of terminal devices coupled to a ring bus via respective node devices, a signal in a response field is sent for a certain time period immediately after the multicast information, and that each of the node devices is provided with mean for determining if the reception of the multicast information has succeeded or failed, and means for relaying the response field per se to the downstream node device in the case where said determining means judges the reception a success, and for changing at least part of the signal in the response field to generate a new response field and send the new response frame to the downstream node device in the case where there is a failure.

The response frame may be a frame structure similar to an ordinary information frame, i.e. the structure including delimiters representative of both ends of the frame, destination addresses, source address and frame signal having a signal indicating the type of information, or may not be a frame structure. Further, the response field to be generated when there is a failure to receive the multicast information, may use a new response frame cancelling the response frame sent from the multicast information transmitting node device, or may change a particular bit of the response frame sent from the transmitting node device as described previously. Furthermore, when a node device receives a response frame whose field indicates a failure to receive at the upstream node device, the node device operates similarly to the case when a node device receives a response frame from a multicast information transmitting node device.

The information the transmitting node device desires to obtain is whether or not all of the multicast information receiving node devices have actually received the information. Therefore, it is not necessary for each of the node devices that have failed to receive the multicast information to send responses, but rather it suffices if at least one of the node devices informs the transmitting node device of a reception failure. Further, if only one response is sent when a plurality of node devices failed to receive the multicast information, a response receiving circuit at the transmitting node device is not required to be complicated, nor contention occurs. In some cases, a response receiving circuit of the type used in point-to-point communication may be used.

According to the structure of the ring network system of the present invention, the transmitting node device receives the response field which it previously transmitted when all of the node devices to which multicast information were sent have received it. Alternatively, when one of the receiving node devices fails to receive the multicast information, the transmitting node device can detect a single response frame indicating a reception failure. Therefore, the transmitting node device can confirm a multicast information transmission success or failure immediately after transmitting the multicast information once around the ring transmission line.

The above-mentioned and other features and objects of this invention will become more apparent by reference to the following description taken in conjunction with the accompanying drawings.

BRIEF DESCRIPTION OF THE DRAWINGS

FIG. 1 is a schematic diagram showing the structure of a ring communication network system to which the present invention is applied;

FIG. 2 shows the structure of a frame used for transmission;

FIG. 3 is a timing chart for explaining an example of the operation of a ring network system of the present invention; and FIG. 4 is a block diagram showing an embodiment of a node device used in a ring network system of the present invention.

DESCRIPTION OF PREFERRED THE EMBODIMENTS

To facilitate understanding the present invention, a ring network system will be briefly explained with reference to FIG. 1.

In the figure, data processing units or terminal devices a, b, c and d are respectively coupled to a ring transmission line 1 via nodes devices 2, 3, 4 and 5.

FIG. 2 shows the structure of a unit of signal, i.e., a frame transmitted over the ring transmission line 1. The frame includes, at opposite ends of the frame, fields of delimiters 12 and 18 representing the start and end of the frame, and between both of these fields, a field 13 representing destination addresses, a field 14 representing a source address, a frame command field 15 representing a type of frame, an information field 16 and a field 17 for error check. The structure of the frame is the same as conventional. The frame command field 15 includes a signal for discriminating the type of frame i.e. if the frame is an information frame, token frame or response frame.

Referring to FIG. 1, when a transmitting node device (e.g., node device 2) requests a multicast information transmission, the transmission node device receives a token frame and thereafter retains a response field following the token frame. As to the response field, there are two cases: one being that no signal is transmitted and the other being that a response frame is transmitted.

When another node device, i.e., a device having no token frame, receives the multicast information, it performs either one of the operations depending on its receiving condition: (1) relaying the received signals in the case of a reception success, or (2) transmitting a response frame representative of a reception failure and at the same time aborting a response frame if the last upstream node device has sent it.

Therefore, when all of the receiving node devices have received the multicast information, the transmitting node devoce receives its own response frame it originally transmitted. Alternatively, if one or more receiving node devices failed to receive the multicast information, the transmitting node device receives a response frame which the last receiving node device transmitted, so that the transmitting node device can be informed of a multicast information transmission failure to again send the multicast information. In this case, when the node device succeeded in receiving the previous multicast information detects the information frame of the current multicast information, the information frame of the current multicast information is neglected to thereby prevent an erroneous operation of the network.

FIG. 3 is a timing chart for explaining an example of the operation of a ring network system for transmitting multicast information according to the present invention. FIG. 4 is a block diagram showing the structure of an embodiment of the node device of FIG. 1.

In the following description, it is assumed that terminal device a of FIG. 1 sends multicast information to terminal devices b, c and d, and that node device 3 has succeeded in receiving the multicast information while node devices 4 and 5 have failed because of a busy state.

When node device 2 requesting a multicast information transmission receives a token frame 6 from node device 5 at a time period t0 to t1, it sends a multicast information frame 7 at a time period t1 to t2. The structure of the multicast frame is the same as shown in FIG. 2. Thereafter, a response frame 20 is sent at a time period (t2 to t3) of a response field 30. Lastly, a token frame 9 is sent for resigning a transmission right.

Node device 3 succeeded in receiving the multicast information frame 7 relays the received frame 7 and response frame per se to node device 4.

Node device 4 failed in receiving the multicast information relays the frame 7 to node device 5 and aborts the received response frame 20-2 to send a new response frame 20-3 indicating a reception failure to node device 5.

Node device 5 also failed in receiving the multicast information frame 7 relays, similarly to the case of node device 4, the frame 7 to node device 2 and aborts the received response frame 20-3 to send a new response frame 20-4 indicating a reception failure to node device 2.

Since node device 2 receives the multicast information frame 7 and the response frame 20-4, node device 2 is informed of a failure in multicast information transmission. After receiving the token frame 9 from node device 5 to obtain a right for transmission, node device 2 again sends the multicast information.

As appreciated from the foregoing description, in spite of a reception failure by two node devices 4 and 5, node device 2 receives only one response frame 20-4 from node device 5. Thus, it is possible to know that at least one of the receiving node devices have failed in receiving the multicast information.

Node device 2 can confirm that all of the receiving node devices have received the multicast information, if the response frame 20-2 transmitted by node device 2 is returned to node 2.

FIG. 4 is a block diagram showing an embodiment of a node device used in a ring network of the present invention.

Data received from the transmission line 1 is synchronized at a synchro 41 and converted from serial data into parallel data at a serial/parallel converter 42 to obtain an 8 bit parallel signal which is commonly used in data processing. In the figure, lines having a slash send a parallel signal. A receiving processing unit 43 checks the address field 13 and frame command field 15 of a received frame. If the received frame is one addressed to the node device now concerned or it is a multicast information frame, the information, i.e., data in the field 16 of FIG. 2 is stored via line 101 in a direct access memory (DMA) 44. The multicast information frame is relayed to the downstream node device via line 105 and a field selector 55.

In the case of a frame addressed to the node device now concerned, an abort controller 56 is actuated to prevent or abort relaying a multicast information frame.

A buffer busy state that the node device cannot receive the multicast information is informed from the DMA 44 to the receiving processing unit 43 over line 101.

A state management unit 46 is informed of a buffer busy state of the node device based on the status of the receiving processing unit 43. The state management unit 46 then actuates a transmitting controller 47 to produce a response frame. In assembling a response frame, as in the above-described frame signals, including destination node addresses DA, transmitting node address SA, information type (representative of a response frame) LC and delimiters DEL, they are read from signal generators 48, 49, 50 and 51 in response to transmitting control signals sent from line 104, and the field selectors 54 and 55 are actuated to produce a response frame as shown in FIG. 2. The field 16 of a produced response frame includes signals indicating a buffer busy state. Outputs from the field selector 55 are sent to the transmission line 1 via a parallel/serial converter 53.

If the node device of FIG. 4 is used for a transmitting node device, signals in the information field are also selected via line 106 in case of first or second multicast information frame transmissions. If a received frame is a response frame 20-2 addressed to the transmitting node device, then the node device can know a multicast information transmission success. This is informed to the terminal device concerned via the receiving processing unit 43 and DMA 44.

In the above embodiment, the response frame 20-2 addressed to the transmitting node device has been sent from the transmitting node device. However, a response field which does not send a signal for a predetermined time after a multicast information frame, may be provided at the transmitting node device which field does not send a signal for a predetermined time after a multicast information frame. In this case, a timer 45 is provided in the circuit of FIG. 4 embodiment so that the transmitting node device counts the time until the multicast information is returned. If a response frame indicating a reception failure is not received within the predetermined time, it is judged that all of the receiving node devices have succeeded in receiving the multicast information.

Further, in the foregoing description of the embodiment, a received response frame has been aborted to send a new response frame indicating a reception failure. However, a particular bit (e.g., a particular bit in the frame command field) of a received response frame may be changed to produce therefrom a reception failure response frame and send it to the next node device, which does not differ in essence from the above embodiment.

According to the present invention, it is possible to efficiently confirm the reception during a multicast information communication. Further, in case of a reception failure, the multicast information can be re-transmitted to realize a reliable multicast information communication.

We claim:

1. A ring network system for transmitting multicast information in which a plurality of terminal devices are coupled to a ring transmission medium via respective node devices, said ring network system comprising:
   a transmitting node device which retains a response field having signals therein for a predetermined time period and then transmitting the response field signals after said transmitting node device transmits a multicast information frame downstream via said transmission medium; and
   a receiving node device including means for determining whether or not said multicast information frame has been successfully received on its upstream side, and in case of a success, relaying said multicast information frame and the signals of said response field per se via its downstream side through said transmission medium to another receiving node device, and in case of a failure to receive the multicast information, sending the signals of said response field downstream to another node device after changing at least part of the response field signals.

2. A ring network system according to claim 1, wherein said response field transmitted from said transmitting node device includes a response frame addressed to said transmitting node device, and wherein said transmitting node device determines that said multicast information communication has succeeded in being received by all of said terminal devices if said response frame addressed to said transmitting node device is returned to said transmitting node device via its upstream side, and determines that said multicast information communication has failed if a response frame produced by said receiving node device is received by said transmitting node device.

3. A ring network system according to claim 1, wherein means for changing at least part of the signals of said response field, aborts a received response frame and sends a new response frame.

4. A ring network system according to claim 2, wherein means for changing at least part of the signals of said response field, includes means for changing a particular bit of a received response frame.

5. A ring network system according to claim 1, wherein a response field transmitted from said transmitting node device does not include a bit signal, and wherein said transmitting node device has a times for counting a time from when said multicast information frame is received back and when a response frame is received, and determines that a multicast information communication has succeeded in being received if a response frame is not received by said transmitting node device within a predetermined time after receiving back said multicast information.

* * * * *